US008817686B2

(12) United States Patent
Cai et al.

(10) Patent No.: US 8,817,686 B2
(45) Date of Patent: Aug. 26, 2014

(54) DOWNLINK REFERENCE SIGNAL FOR TYPE II RELAY

(75) Inventors: Zhijun Cai, Euless, TX (US); Chandra S. Bontu, Ottawa (CA); Yi Yu, Irving, TX (US); Mo-Han Fong, Ottawa (CA); Sophie Vrzic, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 862 days.

(21) Appl. No.: 12/817,076

(22) Filed: Jun. 16, 2010

(65) Prior Publication Data
US 2010/0323684 A1 Dec. 23, 2010

Related U.S. Application Data

(60) Provisional application No. 61/218,903, filed on Jun. 19, 2009.

(51) Int. Cl.
*H04B 7/14* (2006.01)
*H04W 4/00* (2009.01)
*H04W 72/00* (2009.01)
*H04B 7/26* (2006.01)
*H04L 5/00* (2006.01)

(52) U.S. Cl.
CPC ............ *H04B 7/2606* (2013.01); *H04L 5/005* (2013.01); *H04L 5/0051* (2013.01)
USPC .......................................... 370/315; 370/329

(58) Field of Classification Search
CPC .. H04B 7/2606; H04L 5/0007; H04L 5/0023; H04L 5/0051
See application file for complete search history.

(56) References Cited

U.S. PATENT DOCUMENTS

2010/0265874 A1* 10/2010 Palanki et al. ................ 370/315
2010/0273506 A1* 10/2010 Stern-Berkowitz et al. .......................... 455/456.1

(Continued)

FOREIGN PATENT DOCUMENTS

| CN | 1939082 A | 3/2007 |
| KR | 20070068825 A | 7/2007 |

(Continued)

OTHER PUBLICATIONS

PCT Invitation to Pay Additional Fees (Partial Search Report); PCT Application No. PCT/US2010/038866; Nov. 12, 2010; 7 pgs.

(Continued)

*Primary Examiner* — Chirag Shah
*Assistant Examiner* — Srinivasa Reddivalam
(74) *Attorney, Agent, or Firm* — Conley Rose, P.C.; J. Robert Brown, Jr.

(57) ABSTRACT

A network comprising a relay node configured to transmit a first common reference signal (CRS) to a plurality of user agents (UAs) using a first plurality of physical antennas and/or virtual antennas, and an access node configured to transmit a second CRS to the UAs using a second plurality of physical antennas and/or virtual antennas, wherein the first CRS and the second CRS are combined for the same number of first and second physical antennas and/or virtual antennas. Also included is a network comprising a relay node configured to transmit a dedicated reference signal (DRS) to a UA using a first plurality of physical antennas and/or virtual antennas, and an access node configured to transmit a second DRS to the UA using a second plurality of physical antennas and/or virtual antennas, wherein the first DRS and the second DRS are transmitted at about the same time.

32 Claims, 8 Drawing Sheets

(56) References Cited

U.S. PATENT DOCUMENTS

| | | | |
|---|---|---|---|
| 2010/0285792 A1* | 11/2010 | Chen et al. | 455/422.1 |
| 2010/0303034 A1* | 12/2010 | Chen et al. | 370/329 |
| 2010/0309867 A1* | 12/2010 | Palanki et al. | 370/329 |
| 2010/0309876 A1* | 12/2010 | Khandekar et al. | 370/330 |
| 2011/0306291 A1* | 12/2011 | Ma et al. | 455/9 |
| 2012/0020323 A1* | 1/2012 | Noh et al. | 370/330 |

FOREIGN PATENT DOCUMENTS

| | | |
|---|---|---|
| WO | 2008115588 A2 | 9/2008 |
| WO | 2010017628 A1 | 2/2010 |

OTHER PUBLICATIONS

LG Electronics; 3GPP TSG RAN WG1 Meeting #57; Title: "Considerations on RS Transmission in Type II Relay"; R1-092121; San Francisco, USA; May 4-8, 2009; 5 pgs.

3GPP TS 36.211 v8.2.0; 3rd Generation Partnership Project; Technical Specification Group Radio Access Network; Evolved Universal Terrestrial Radio Access (E-UTRA); Physical Channels and Modulation; Release 8; Mar. 2008; 65 pgs.

3GPP TS 36.211 V8.2.0; 3rd Generation Partnership Project; Technical Specification Group Radio Access Network; Evolved Universal Terretrial Radio Access (E-UTRA); Physical Channels and Modulation; Release 8; Mar. 2008; 65 pages.

3GPP TSG RAN WG1 Meeting #57; Considerations on RS Transmission in Type II Relay; LG Electronics; 15.3; R1-092121; San Francisco, USA; May 4-8, 2009; 5 pages.

3GPP TSG RAN WG1 Meeting #55; LTE Signaling to Support Relay Operation; Motorola; 11.5; R1-084412; Prague, Czech Republic; Nov. 10-14, 2008; 6 pages.

3GPP TSG RAN WG1 Meeting #56bis; Considerations on eNB-to-Relay Backhaul Design; CMCC; 15.3; R1-091831; San Francisco, USA; May 4-8, 2009; 4 pages.

3GPP TSG RAN1 #57; Cooperation Scheme Considerations for Type II Relay; ZTE; 15.3; R1-091710; San Francisco, US; May 4-8, 2009; 4 pages.

3GPP TSG-RAN WG1 #56bis; Further Consideration on L2 Transparent Relay; Vodafone; 15.3; R1-091403; Seoul, Korea; Mar. 23-27, 2009; 7 pages.

3GPP TSG RAN WG1 #57; System Design Frameworks to Support Type II Relay Operation in LTE-A; Alcatel-Lucent, CHTTL; 15.3; R1-092157; San Francisco, CA; May 4-8, 2009; 11 pages.

3GPP TSG RAN WG1 Meeting #56bis; DL RS Design for LTE-Advanced; NTT DOCOMO; 15.1; R1-091483; Seoul, Korea; Mar. 23-27, 2009; 6 pages.

PCT International Search Report; PCT Application No. PCT/US2010/038866; Apr. 11, 2011; 7 pages.

PCT Written Opinion of the International Searching Authority; PCT Application No. PCT/US2010/038866; Apr. 11, 2011; 12 pages.

Canadian Office Action; Application No. 2,764,574; Jul. 30, 2012; 2 pages.

3GPP TR 36.814 v0.4.1; 3rd Generation Partnership Project; Technical Specification Group Radio Access Network; Further Advancements for E-UTRA; Physical Layer Aspects; Release 9; Feb. 2009; 31 pgs.

Pabst, Ralf, et al.; Title: Relay-Based Deployment Concepts for Wireless and Mobile Broadband Radio; Wireless World Research Forum; IEEE Communications Magazine; Sep. 2004; 10 pgs.

3GPP TS 36.304 v8.5.0; 3rd Generation Partnership Project; Technical Specification Group Radio Access Network; Evolved Universal Terrestrial Radio Access (E-UTRA); User Equipment (UE) Procedures in Idle Mode; Release 8; Mar. 2009; 30 pgs.

3GPP TS 36.331 v8.5.0; 3rd Generation Partnership Project; Technical Specification Group Radio Access Network; Evolved Universal Terrestrial Radio Access (E-UTRA); Radio Resource Control (RRC); Protocol Specification; Release 8; Mar. 2009; 204 pgs.

3GPP TS 36.211 v8.6.0; 3rd Generation Partnership Project; Technical Specification Group Radio Access Network; Evolved Universal Terrestrial Radio Access (E-UTRA); Physical Channels and Modulation; Release 8; Mar. 2009; 83 pgs.

TSG-RAN WG1 #53; Ericsson; Title: A Discussion on Some Technology Components for LTE-Advanced; R1-082024; Kansas City, MO; May 5-9, 2008; 11 pgs.

TSG-RAN WG1 #54; China Mobile, Vodafone, Huawei; Title: Application Scenarios for LTE-Advanced Relay; R1-082975; Jeju, Korea; Aug. 18-22, 2008; 7 pgs.

3GPP TSG RAN WG1 Meeting #53bis; Samsung; Title: Application of Network Coding in LTE-Advanced Relay; R1-082327; Warsaw, Poland; Jun. 30-Jul. 4, 2008; 4 pgs.

3GPP TSG-RAN WG1 #54; Qualcomm Europe; Title: Operation of Relays in LTE-A; R1-083191; Jeju, Korea; Aug. 18-22, 2008; 5 pgs.

TSG-RAN WG1 #54; Motorola; Title: Classifications of Relays; R1-083223; Jeju, Korea; Aug. 18-22, 2008; 3 pgs.

Canadian Office Action; Application No. 2,764,574; Dec. 16, 2013; 2 pages.

Chinese Office Action; Application No. 201080027069.3; Nov. 25, 2013; 9 pages.

Chinese Office Action as Received in Co-pending Application No. 201080027069.3 on Jul. 3, 2014; 3 pages.

\* cited by examiner

DOWNLINK REFERENCE SIGNAL FOR TYPE II RELAY

CROSS-REFERENCE TO RELATED APPLICATIONS

The present application claims priority to U.S. provisional patent application No. 61/218,903 filed Jun. 19, 2009, by Zhijun Cai, et al, entitled "Downlink Reference Signal for Type II Relay", which is incorporated by reference herein as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) and LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE or LTE-A system can include protocols such as a Radio Resource Control (RRC) protocol, which is responsible for the assignment, configuration, and release of radio resources between a UA and a network node or other equipment. The RRC protocol is described in detail in the Third Generation Partnership Project (3GPP) Technical Specification (TS) 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network nodes with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods and systems for providing relay transparency requirements for wireless telecommunications systems. Accordingly, the relay nodes may be configured to support one of a plurality of reference signal transmission schemes for channel estimation and mobility measurements. In a first scheme, the relay node, as well as the access node may transmit a common reference signal (CRS) to a plurality of UAs. In a second scheme, the relay node may transmit a dedicated reference signal (DRS) to one of the UAs. Alternatively, the relay node may transmit a DRS to the UA for signal demodulation and a channel state information reference signal (CSI RS) for channel measurement. Additionally, the reference signal transmissions may be configured for multiple-input multiple-output (MIMO) channel measurements.

Figure 1:
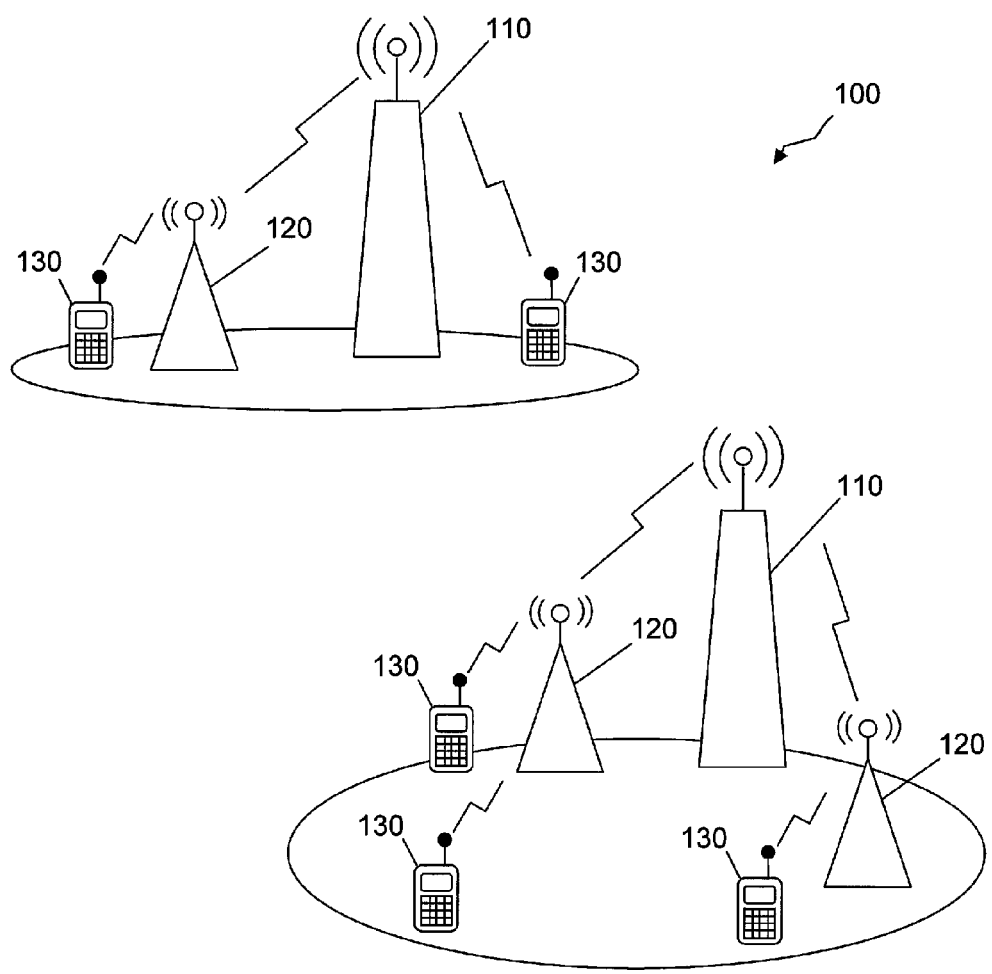
FIG. 1 is a diagram illustrating a radio access network according to an embodiment of the disclosure.

FIG. 1 illustrates an embodiment of a radio access network (RAN) 100, which may be a LTE or LTE-A network as described in the 3GPP. FIG. 1 is exemplary and may have other components or arrangements in other embodiments. In an embodiment, the RAN 100 may comprise at least one access device 110, at least one relay node (RN) 120, and at least one UA 130. The access devices 110 may be an ENB, a base station, or other components that promote network access for the UAs 130. The access devices 110 may communicate with any UA 130, which may be within the same cell, directly via a direct link. A cell may be a geographical area of reception and transmission coverage. For instance, the direct link may be a point-to-point link established between the access device 110 and the UA 130 and used to transmit and receive signals between the two. The access devices 110 may communicate with at least some of the RNs 120, which may be in the same cell, via relay links or with other access devices 110. Additionally, the access devices 110 may communicate with other components or devices to provide for the components of the RAN 100 access to other networks, for instance using similar or different network protocols or technologies.

The RNs 120 may communicate with any UA 130 within the same cell via access links and with the access devices 110 via relay links to establish indirect communications between the UAs 130 and the access devices 110. For instance, the access link may be a point-to-point link established to exchange signals between an RN 120 and a UA 130 and the relay link may be a point-to-point link established to exchange signals between the RN 120 and the access device 110. Further, the UAs 130 may be moved due to handover between the cells corresponding to different access devices 110 or RNs 120. Hence, the UAs 130 may establish communications with the access devices 110 via direct links or with different RNs 120 via access links. Further, the UAs 130 may communicate with one another using the direct links established with the access device 110 or using the access links established with the RNs 120 and the relay links between the RNs 120 and the access devices 110.

The RNs 120 may be used to enhance coverage within or near a cell, or to extend the size of coverage of a cell. Additionally, the use of a relay node 120 can enhance throughput of a signal within a cell because the UA 130 can access the relay node 120 at a higher data rate or a lower power transmission than the UA 130 might use when communicating directly with the access node 110 for that cell. Transmission at a higher data rate using the same amount of bandwidth creates higher spectral efficiency and lower power benefits for the UA 130 by consuming less battery power.

The RNs 120 may relay the signals between the UAs 130 and the access node 110 using frequency-division duplexing (FDD) mode, where signals are received and transmitted at different frequencies. As such, the RNs 120 may receive and transmit signals at about the same time with reduced signal interference between the received and transmitted signals. However, transmitting and receiving the signals to the UAs 130 and the access nodes 110 at about the same time may be difficult due to technical challenges related to the transmitters, receivers, or transceivers at the RNs 120. Hence, the RNs may relay the signals to the UAs 130 and the access nodes 110 using time-division duplexing (TDD) mode, where the signals may be transmitted and received at different transmission time intervals (Ms).

The RNs 120 may comprise at least one of three types of devices, Layer One (L1) relays, Layer Two (L2) relays, and Layer Three (L3) Relays. The L1 relays may be repeaters that receive, amplify and retransmit signals (without demodulation/decoding of the signals) between the UAs 130 and the access devices 110. The L2 relays may receive and transmit the signals, for instance using TDD and/or FDD mode. The L2 relays may demodulate and decode the received signals and encode and modulate the signals before retransmission, for instance based on radio conditions, to improve transmission reliability. Additionally, the L2 relays may use resource scheduling for transmitting and receiving the signals from the UAs 130 or the access devices 110. The L3 relays may be more robust devices with the capabilities of eNBs that are configured similar to the access devices 110 or comprise at least some of the functionalities of the access devices 110, such as radio resource control (RRC) and resource scheduling. The L3 relays may require the assistance of the access node to communicate with the packet core and core network.

The RNs 120 may be Type Two (Type II) relays, for example as described in 3GPP RAN1#56bis, which may be a L2 relay, which may communicate with the UA and the access node, such as eNB, within the same cell without establishing a separate cell and without using a separate cell ID. The Type II relays may communicate with LTE Release 8 UAs as well as more advanced UAs, e.g. LTE Release 9 UAs or Release 10 UAs. Additionally, the Type II relays may be transparent to the UAs, such that the UAs 130 may communicate with the access nodes 110 via the assistance of the RN 120 without being aware of the presence of the RNs 120. For instance, the Release 8 UAs may receive reference signals from the access nodes 110 while also receiving reference signals from the RNs 120. The reference signals may be transmitted over pre-determined physical resources and may be used for channel estimation for the purpose of demodulation and channel measurement and mobility measurements to improve communication reliability. The reference signals transmitted from the RN 120 to the UA 130 may be a CRS, a DRS, or a CSI RS, such as described in detail below.

Figure 2A:
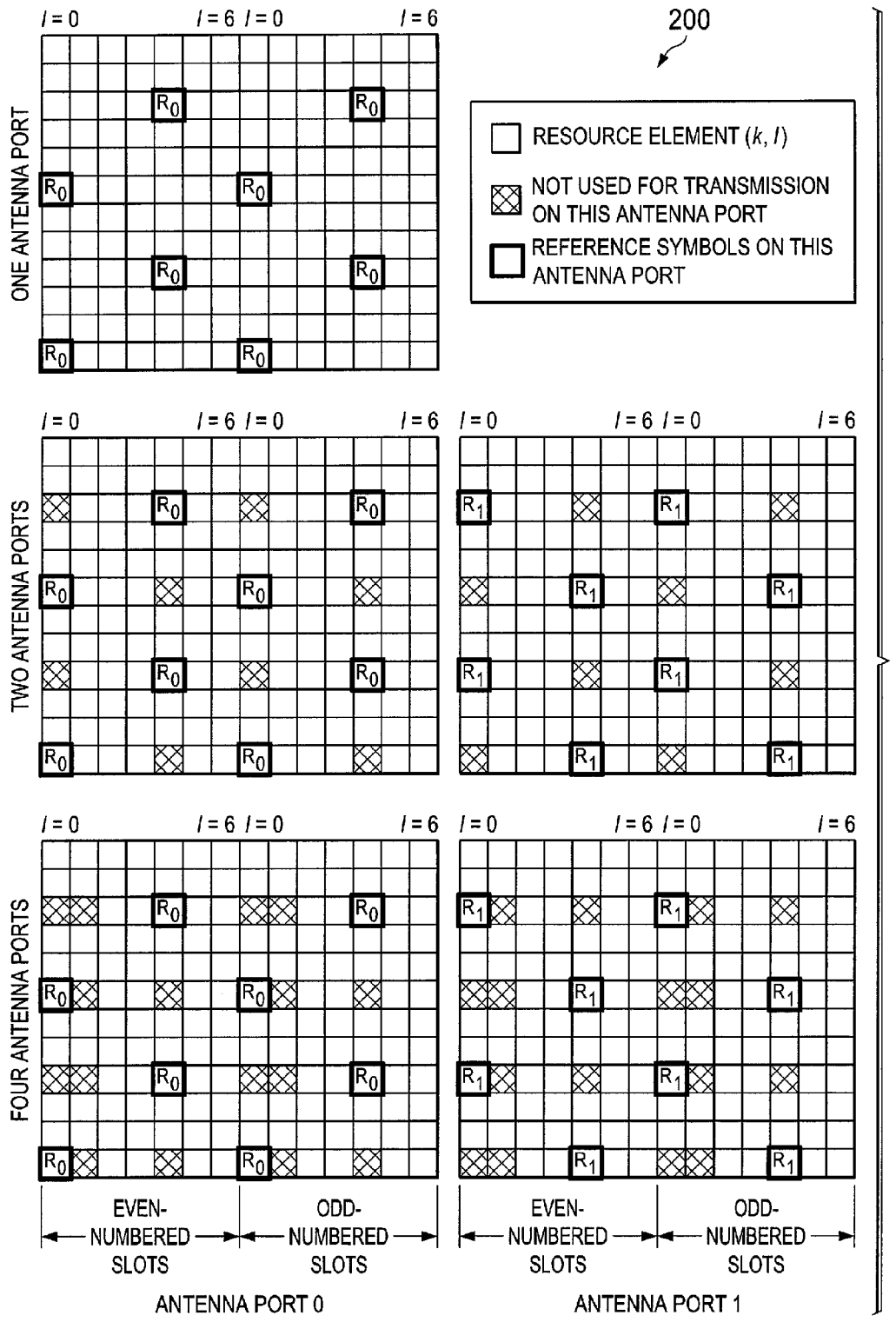
FIG. 2 is a chart of common reference signal transmission according to an embodiment of the disclosure.
Figure 2B:
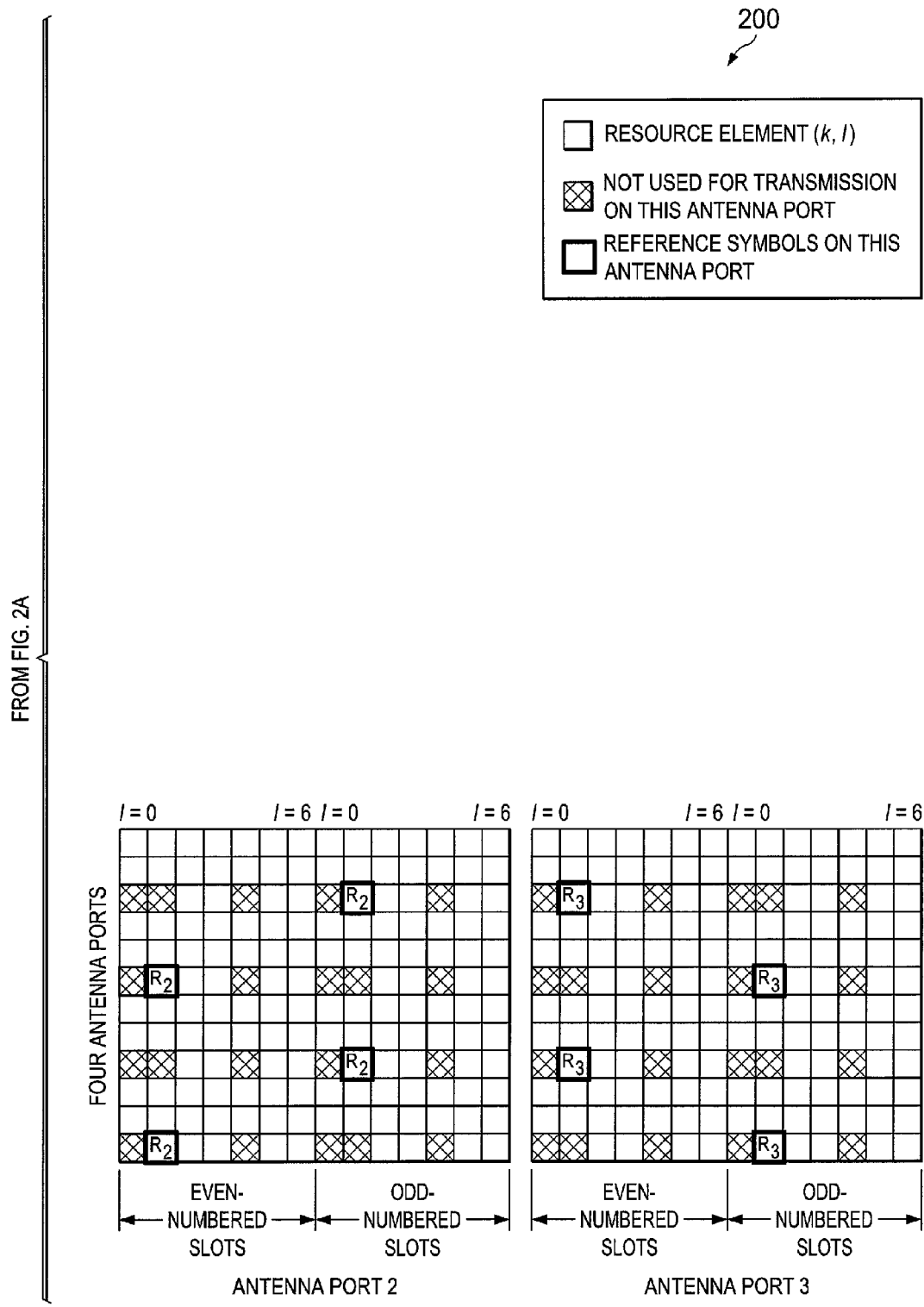

FIG. 2 illustrates an example of a CRS transmission 200, which may be sent from the RN 120 and the access node 110 to the UA 130. The CRS may comprise the same allocated resources (e.g. resource element (RE), transmission time interval (TTI), frequency, etc.) and the same signal sequence for a plurality of UAs 130 in the cell. The UA 130 may receive a CRS on each of its antenna ports. For instance, the UA 130 may receive a CRS on one port, on each of two ports, or on each of four ports, as shown in FIG. 2. The access node 110 and the RN 120 may use similar or different antenna configurations to transmit the CRS. For example, the access node 110 may transmit a CRS using four transmitters or physical antennas and the RN 120 may transmit a CRS using two transmitters or physical antennas. The UA 130 may receive a combined CRS from the two physical antennas of the RN 120 and the two physical antennas of the access node 110, and another CRS from the remaining two physical antennas of the access node 110. Alternatively, the RN 120 may transmit a CRS using its two physical antennas and the access node 110 may transmit a CRS using two virtual antennas. The virtual antennas may be each obtained using antenna virtualization from the actual physical antennas of the access node 110. Hence, the UA 130 may receive a combined CRS from the two physical antennas of the RN 120 and the two virtual antennas of the access node 110. In some embodiments, the RN 120 may transmit a dedicated reference signal (DRS) in addition to the CRS, which may be intended for one of the UAs 130 in the cell.

Further, a cyclic prefix (CP) in the transmitted reference signal may be used to substantially compensate for any delay spread in the combined CRS from the RN 120 and the access node 110. Since both the RN 120 and the access node 110 are located in the same cell, a standard CP length may be sufficient to compensate for the delay spread. The network components may also be further configured to reduce potential CRS interference to the direct linked UAs 130. The UAs 130 may estimate the combined CRS from the access node 110 and the RN 120, and estimate precoding matrix indicator (PMI)/rank indication (RI) feedback based on the combined CRS.

Figure 3:
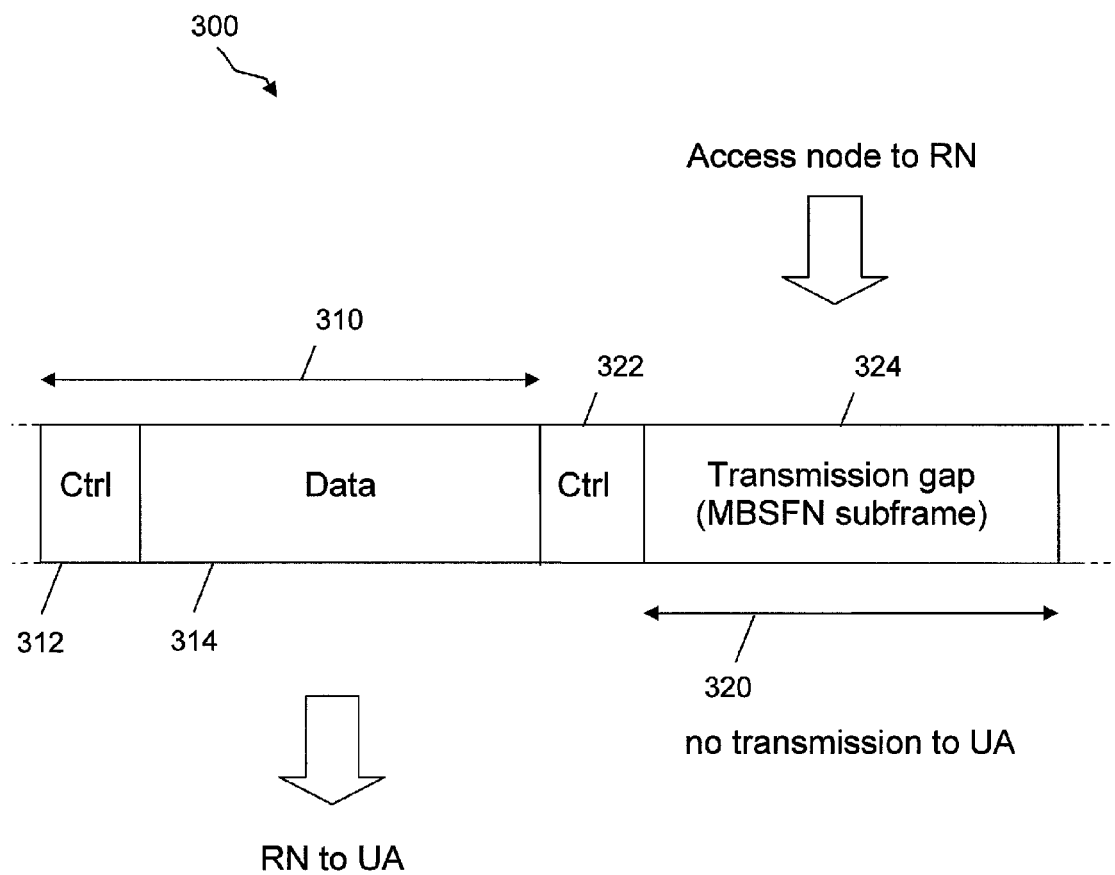
FIG. 3 is a diagram of a subframe sequence between a relay node and a UA according to an embodiment of the disclosure.

FIG. 3 illustrates a subframe sequence 300, which may be sent from the RN 120 to the UA 130. Specifically, the subframe sequence 300 may incur intermittent CRS transmission from the access node 110 and the RN 120 to the UA 130. The subframe sequence 300 may include a first subframe 310 and a second subframe 320. The RN 120 may transmit the first subframe 310 to the UA 130 via the access link. The RN 120 may then receive a subframe from the access node 110 via the relay link and transmit at about the same time the second subframe 320 to the UA 130 via the access link. The first subframe 310 may comprise user information or data transmitted using a plurality of RBs or resource elements (REs), e.g. at different time and frequency combinations. Specifically, the first subframe 310 may comprise a control portion 312 and a data portion 314. The control portion 312 may comprise downlink control information, control channels including a PDCCH, and other control information for managing communications and resource allocation. The data portion 314 may comprise a physical downlink shared channel (PDSCH) that may also include the CRS and user data, such as voice and/or video data. As used herein the terms control portion and control region may be used synonymously.

The second subframe 320 may be a multi-media broadcast/multicast single frequency network (MBSFN) subframe, which may comprise only control information, as described in the 3GPP TS 36.211. Specifically, the second subframe 320 may comprise a control portion 322 and a transmission gap portion 324. The transmission gap portion 324 may comprise no data transmitted from the RN to the UA 130 on the access link. During the transmission gap, the RN 120 may receive the signal from the access node 110. Since, the transmission gap portion 324 may not comprise a PDSCH to the UA 130, the CRS may not be transmitted to the UA 130 in the transmission gap portion 324 of the second subframe 320. The control portion 322 may comprise a PDCCH and a plurality of reference signals, such as the CRS for channel estimation and mobility measurements. The control portion 322 may also comprise other control channels, such as a physical control format information channel (PCFICH) and a physical hybrid automatic repeat request indicator channel (PHICH). Since the first subframe 310 and the control portion of the second subframe 320 but not the transmission gap of the second subframe 320 may comprise a CRS, the UA 120 may intermittently receive a combined CRS from the access node 110 and the RN 120 in the first subframe 310 and the control portion in the second subframe 320, and may receive a CRS from the access node 110 only in the transmission gap of second subframe 320.

The UA 130 may be configured by the access node 110 to properly process the intermittent CRS transmission. For instance, the access node 110 may send the MBSFN subframe configuration, e.g. timing and sequence, to the UA 130. In one embodiment, the access node 110 may send the MBSFN subframe configuration, which may be associated with a RN 120 in communication with the UA 130. The UA 130 may then use the MBSFN subframe configuration to properly schedule the detection of the combined CRS during the non-MBSFN subframe communication time. The access node 110 may use dedicated signaling to send the MBSFN subframe configuration associated with a RN 120 to any UA 130 in communication with the RN 120 in the cell. As such, the communications between the remaining UAs 130 and the access node 110 or other RNs 120 may not be affected. For instance, during the transmission time of the MBSFN subframe between the RN 120 and its associated UA 130, the remaining UAs 130 in the cell may continue to estimate the CRS from the access node 110 and/or other RNs 120.

Typically, system information (SI) broadcast signaling may be used to transfer the MBSFN configuration to a plurality of UAs 130 in a cell. However, to support the dedicated signaling of MBSFN configuration to a UA 130 associated with a RN 120 in the cell, the RRC signaling for Release 8 UAs may be modified by adding MBSFN configuration information to the RRC signaling messages. Specifically, RRC-ConnectionSetup and/or RRCConnectionReconfiguration messages may be modified and used for dedicated signaling of the MBSFN configuration information. Such MBSFN configuration information may include:

```
MBSFN-SubframeConfigList ::=    SEQUENCE (SIZE (1..maxMBSFN-Allocations))
                                OF MBSFN-SubframeConfig
MBSFN-SubframeConfig ::=        SEQUENCE {
    radioframeAllocationPeriod      ENUMERATED {n1, n2, n4, n8, n16, n32},
    radioframeAllocationOffset      INTEGER (0..7),
    subframeAllocation              CHOICE {
        oneFrame                            BIT STRING (SIZE(6)),
        fourFrames                          BIT STRING (SIZE(24))
                                    }}.
```

In another embodiment, the access node 110 may broadcast the MBSFN subframe configuration for a RN 120 to all the UAs 130 in the cell, for instance using a system information block (SIB-2). Hence, all the UAs 130 in the cell may use the same MBSFN subframe configuration to estimate the CRS. As such, the RRC messages for Release 8 may be used with no changes to signal the MBSFN configuration to all the UAs 130. However, by broadcasting the same MBSFN configuration, all UAs 130 in the cell may consider the MBSFN subframes as unavailable for estimating the CRS signal, even for the direct linked UAs, which may reduce the overall spectral efficiency for communications.

Further, the allocation of the MBSFN subframe configuration may be semi-static, where the access node 110 may initially specify the MBSFN subframe configuration in SIB-2. For instance, the SIB-2 may comprise information about the scheduling of the MBSFN subframes and the periodicity of the MBSFN subframes in terms of radio frames. The subframe period or radio frame allocation may be assigned to support sufficient bandwidth for data transfer between the access node 110 and the RNs 120. The access node 110 may then monitor the number of UAs 130 communicating with the RNs 120 and the corresponding Quality of Service (QoS) requirements of the associated RBs, and hence reconfigure accordingly the MBSFN subframes in order to adapt to the changing network requirements either periodically or when needed.

Figure 4:
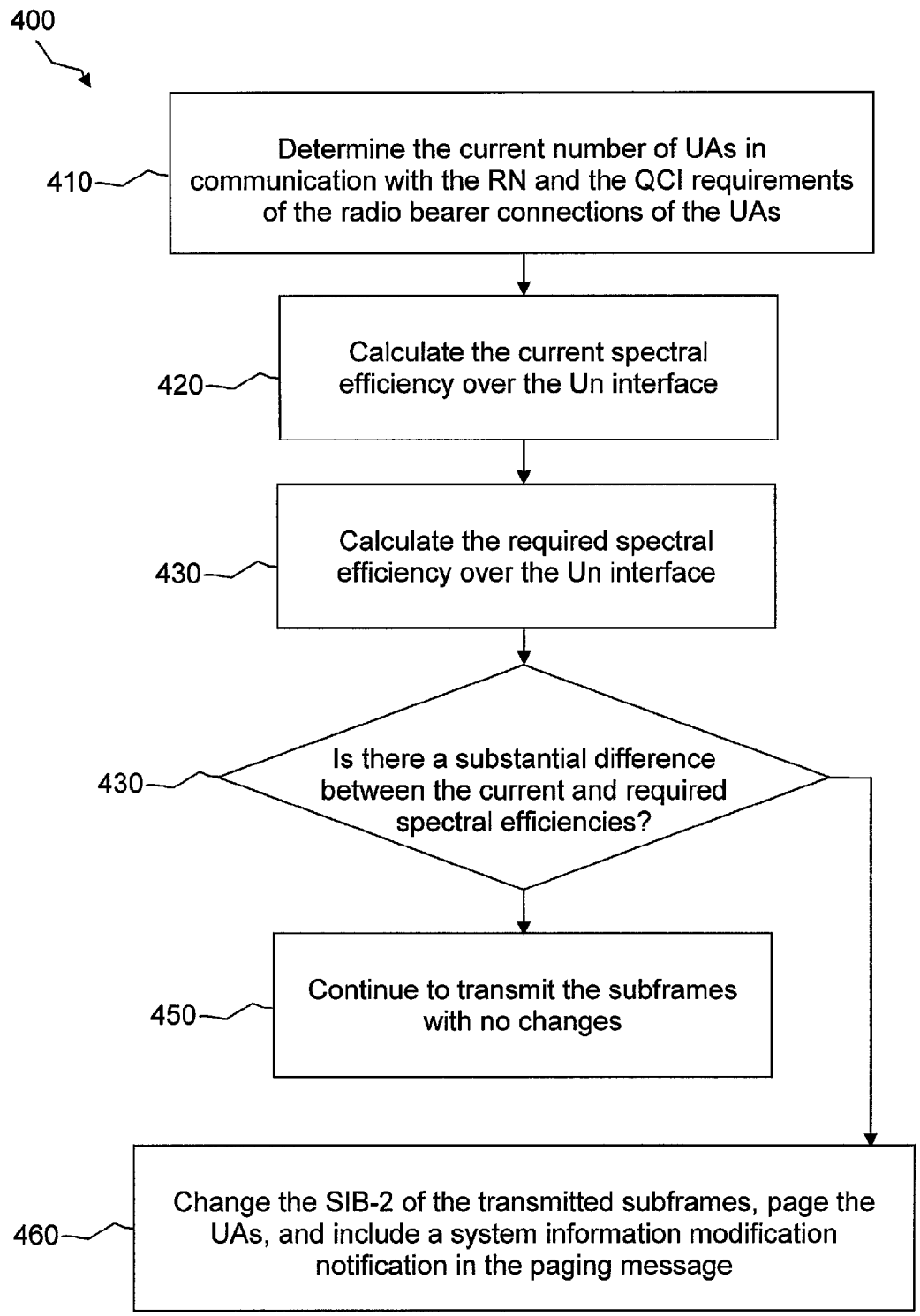
FIG. 4 is a flowchart of an adaptive procedure 400 for reconfiguring multicast/broadcast single frequency network subframes according to an embodiment of the disclosure.

FIG. 4 illustrates an embodiment of an adaptive procedure 400 for reconfiguring MBSFN subframes. Specifically, the method 400 may be implemented by the access node 110 to monitor the network requirements and change the MBSFN configuration to improve spectral efficiency. At block 410, the access node 110 may determine the current number of UAs 130 in communication with the RN 120 and configured for supporting MBSFN subframes, and the QoS or QoS Class Indicator (QCI) requirements of the radio bearer connections associated with the UAs 130. Such determination may be triggered periodically or based on a request. At block 420, the access node 110 may calculate the current spectral efficiency over the interface between the access node 110 and the RN 120, also referred to as Un interface. At block 430, the access node 110 may calculate the spectral efficiency required or needed for the Un interface. When calculating the spectral efficiency requirement of Un, the access node 110 may include all bandwidth requirements for transmissions to the relay nodes and also the bandwidth requirements for transmissions to the UAs in multi-media broadcast/multicast services (MBMS) transmission mode. At block 440, the access node 110 may verify whether there is a substantial difference between the current spectral efficiency and the required spectral efficiency over the Un interface. If a substantial difference is found between the current and required spectral efficiencies, the method 400 may proceed to block 460. Otherwise, the method 400 may proceed to block 450, where the access node 110 may continue to transmit the subframes with no changes. Alternatively, at block 460, when the current and required spectral efficiencies are substantially different, the access node 110 may change the SIB-2 to reconfigure the MBSFN subframes and the access node 110 pages the UAs 130 configured for receiving MBSFN subframes, such as all the UAs associated with a SI RNTI (SI-RNTI) may be aware of the change in SI. The access node 110 may also include a system information modification notification in the paging messages. Alternatively, the access node 110 may change the system information value tag in the SIB-1 of the transmitted subframes to inform the UAs about the change in SI.

In an alternative embodiment, the access node 110 may broadcast the MBSFN subframe configuration to all the UAs 130 in the cell, for instance using a system information block (SIB-2). In addition, the access node 110 may send additional signaling to the LTE Release 10 UAs in the cell to indicate the specific MBSFN subframes that are used for access node 110 transmission to the RN 120. For instance, the additional signaling may be sent to each LTE Release 10 UA using dedicated signaling or may be multicasted to the Release 10 UAs using for example a group Radio Network Temporary Identifier (RNTI) associated with all the LTE Release 10 UAs. The signaled MBSFN subframe configuration may indicate specific MBSFN subframes, which may be used for transmissions from the access node 110 to the RNs 120, transmissions to the LTE Release 10 UAs, and for LTE Release 10 UAs CRS channel estimation purposes.

Figure 5:
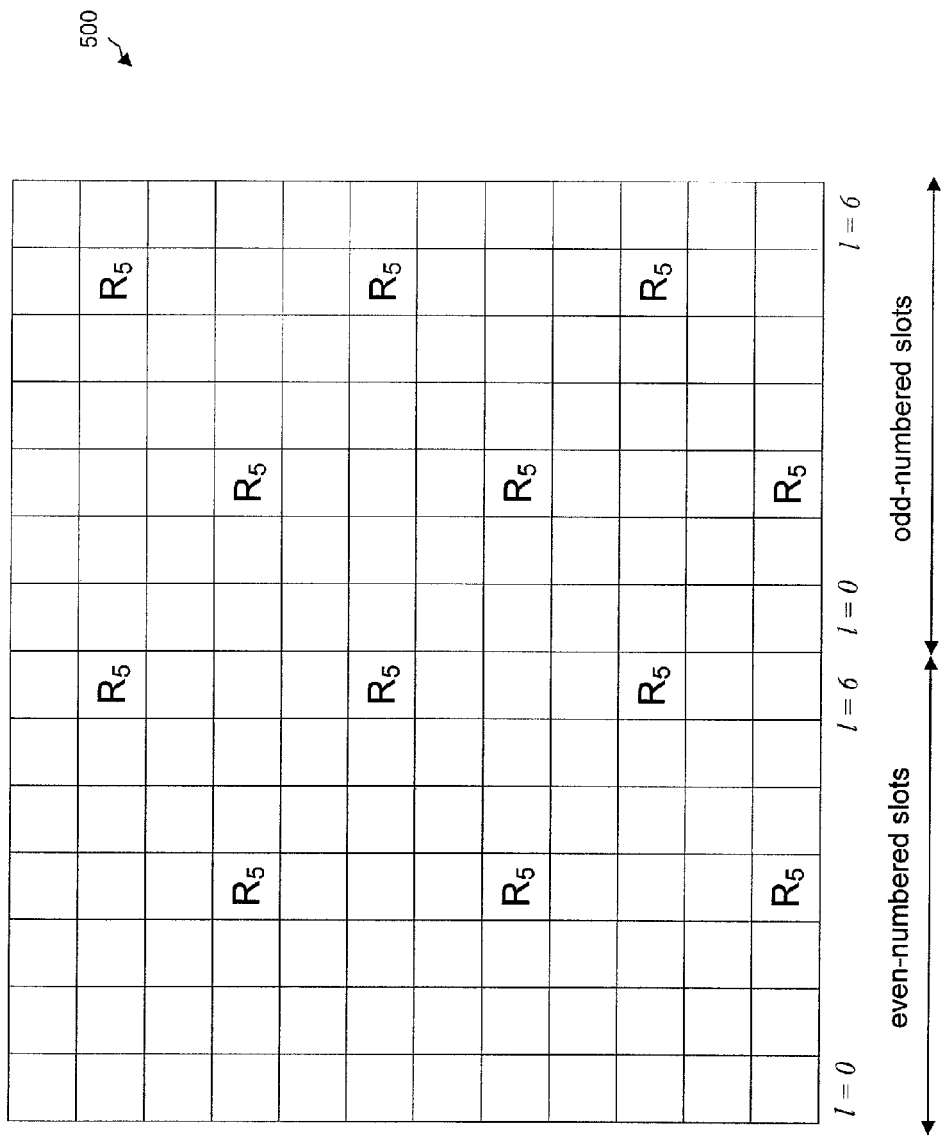
FIG. 5 is a chart of dedicated reference signal transmission according to an embodiment of the disclosure.

FIG. 5 illustrates an embodiment of a DRS transmission 500, which may be sent from the RN 120 and the access node 110 to one of the UAs 130, and may comprise a plurality of allocated resources and a signal sequence for that UA 130. The UA 130 may receive the combined DRS from the access node 110 and the RN 120 using an antenna port. For example, the UA 130 may use a fifth antenna port to receive the combined DRS. The access node 110 and the RN 120 may use similar or different antenna configurations to transmit the DRS. The DRS transmission 500 may be sent using transmission or beamforming mode 7 in Release 8 or dual layer beamforming (BF) in Release 9. However, using beamforming mode 7, the RN 120 may not transmit with the DRS other system information, paging information, PDCCH, and Random Access Response (RAR). Further, the DRS transmission 500 may only be sent when the access node 110 and the RN 120 transmit data to the UA 130 at about the same time.

In an alternative embodiment, which may be generally be applied to both Type One (Type I) and Type II relay nodes or in a system comprising access nodes without relay nodes, the RN 120 and/or the access node 110 may send CSI RS to a UA 130 in addition to the DRS. Specifically, the CSI RS may be used for channel measurement and the DRS may be used for signal demodulation. The access node 110 and the RN 120 may each transmit the CSI RS using physical antennas or virtual antennas. The CSI RS transmitted by different physical or virtual antennas of the access nodes 110 and RNs 120 may be orthogonal to one another by having a different CSI RS location, e.g. different subframe and time/frequency tones in the subframe. Additionally, each CSI RS may have a different sequence for different physical antennas or virtual antennas of different access nodes 110 and RNs 120. In some embodiments, the CSI RS may have the same CSI RS location and the same sequence for a plurality of RNs 120 or access nodes 110 if their coverage areas or cells do not overlap. Alternatively, if the coverage areas overlap, a plurality of RNs 120 or access nodes 110 may each transmit a CSI RS on a specified physical or virtual antenna that has the same CSI RS location and the same sequence so that the UA 130 may receive a combined CSI RS over a composite channel.

The RN 120 may receive the CSI RS configuration to be used by the RN 120 for transmission, e.g. the CSI RS location and sequence, from the access node 110 via signaling. The CSI configuration may be based on the antenna configuration of the RN 120, which may be previously signaled from the RN 120 to the access node 110, for example using RRC signaling. Further, the UA 130 may not be aware of such CSI RS information exchanged between the access node 110 and the RN 120. However, Release 10 UAs 130 may still receive, from the access node 110, the CSI RS configuration for the antenna ports that the UA 130 is configured for detecting a CSI RS. The access node 110 may also use signaling, e.g. RRC signaling or Media Access Control (MAC) signaling, to transmit the CSI RS configuration for the UA 130.

Release 10 UAs may use the CSI RS to obtain MIMO channel measurements and hence send feedback to the access node 110 and/or the RN 120. The feedback may comprise a PMI and/or a channel matrix H. The channel matrix H feedback may comprise full channel information or some compressed channel information. The feedback may be used to support cooperative multipoint (CoMP) MIMO transmission as well as non-CoMP MIMO transmission from the access node 110 or the RN 120.

In the case of non-CoMP MIMO transmissions, the access node 110 or RN 120 that transmits a PDSCH to the UA 130 may determine the precoding of the PDSCH transmission. Alternatively, the access node 110 may determine the precoding for the RN's PDSCH transmission, for instance based on the PMI and/or H matrix feedback from the UA 130. Alternatively, Release 8 UAs may not be configured to obtain CSI RS signals but may still receive CRS signals for MIMO channel measurements.

In the case of CoMP MIMO transmissions, a plurality of access nodes 110 and/or RNs 120 may use joint precoding in the PDSCH across the physical antennas and/or virtual antennas of the plurality of access nodes 110 and/or RNs 120. The access nodes 110 and/or RNs 120 may transmit to the UA 130 a plurality of precoded spatial multiplexing layers of PDSCH data, which may be orthogonal to each other. Each received layer at the UA 130 may be a jointly precoded transmission from all or some of the access nodes 110 and/or RNs 120. A DRS for each precoded layer may also be transmitted using the same joint precoding as PDSCH across the physical antennas and/or virtual antennas for demodulation at the UA 130. In another embodiment, each of the access nodes 110 or RNs 120 may use a separate precoding for its set of physical antennas and/or virtual antennas for both PDSCH data and DRS. Each of the access nodes 110 or RNs 120 may transmit different sets of spatial multiplexed layers to the UA 130. In this case, the DRS for different spatial multiplexed layers that are transmitted from different access nodes 110 or RNs 120 may be orthogonal to each other. Alternatively, the access nodes 100 or RNs 120 may transmit the same sets of spatial multiplexed layers to the UA 130. Each spatial multiplexed layer received at the UA 130 may be a superposition of the corresponding layer transmission from all the access nodes 110 or RNs 120 participating in the CoMP transmission. In this case, the DRS for a spatial multiplexed layer received at the UA 130 may be a superposition of the DRS transmitted from the access nodes 100 and/or RNs 120 participating in CoMP transmission for the corresponding layer. In the case where the access nodes 110 and/or RNs 120 transmit the same set of spatial multiplexed layers using different number of physical antennas, the access nodes 110 and/or RNs 120 may establish the same number of virtual antennas using weighted linear or non-linear combinations of their physical antennas.

In some embodiments, at least some of the spatial multiplexed layers from a subset of the access nodes 110 and/or RNs 120 may partially overlap. Accordingly, the overlapping layers received at the UA 130 may be a superposition of the transmissions from that subset of access nodes 110 and/or RNs 120. Similarly, the DRS corresponding to each overlapping layer may be a superposition of the precoded DRS from each one of the subset of access nodes 110 and/or RNs 120. In some embodiments, the network components may be configured for coordinated beamforming, where one of the access nodes 110 and RN 120 may transmit a beam to the UA 130 at a time. As such, a "beamformed" DRS may be transmitted by the access node 110 or RN 120 that transmits the PDSCH to the UA 130.

In an embodiment, when the RN 120 transmits a CRS, the access node 110 and the RN 120 may simultaneously transmit data using transmit diversity. The access node 110 and RN 120 may simultaneously transmit a plurality of control signaling transmissions, including broadcast channel (BCH), paging channel (PCH), PDCCH, PHICH, and PCFICH, which may be based on transmit diversity. When the RN 120 transmits a DRS but not a CRS, the access node 110 and the RN 120 may simultaneously transmit data based on transmission mode 7 and only the access node 110 may transmit the control signaling information. Further, both the access node 110 and the RN 120 may broadcast SI across the network, for instance in a synchronous manner, to increase broadcast coverage. As such, the access node 110 may send the RNs 120 registered with the access node 110 relevant system information, such as master information block (MIB) and system information blocks (e.g. SIB-1, SIB2, etc.). Additionally, the access node 110 may inform the RNs 120 of the scheduling of the MIB, SIB-1, and SIB-2 to SIB-11.

Figure 6:
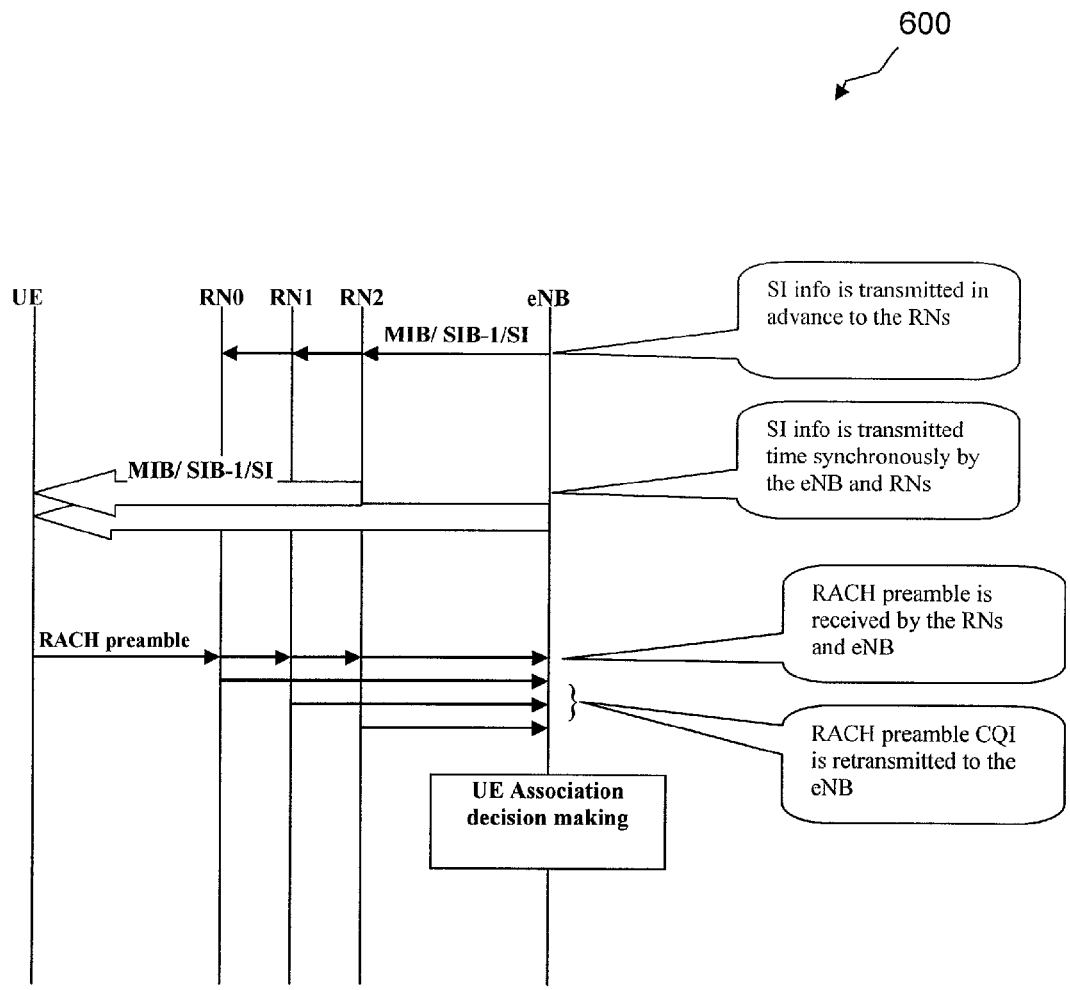
FIG. 6 is a protocol diagram for synchronous SI broadcast according to an embodiment of the disclosure.

FIG. 6 illustrates an embodiment for a synchronous SI broadcast 600, which may be used to transmit the SI from the access node 110 and the RNs 120. Initially, the access node 110, e.g. ENB, may transmit the SI information, e.g. MIB and/or SIB-1, to the RNs 120, e.g. RN0, RN1, and RN2. For instance, the SI information may be received by the RNs 120. Next, the same SI information may be broadcasted from the access node 110 and the RNs 120 to the UA 130 (or UE) simultaneously or in a time synchronous manner. The UA 130 may access the system using a Physical Random Access Channel (RACH) preamble to the RNs 120 and the access node 110. For instance, the RACH preamble information may be received by one of the RNs 120, e.g. RN0, and then relayed back to the access node 110. Additionally, each of the RNs 120 may transmit a RACH preamble Channel Quality Indicator (CQI) to the access node 110. The access node 110 may use the RACH preamble and CQI to configure network resources. When the RACH/CQI information is received by the access node 110 directly from the UA 130, the access node 110 may wait until receiving the related RACH/CQI information relayed by the RN 120. The two independent signals received from the RN 120 and UA 130 may then be combined to improve performance.

Additionally, when the access node 110 and the RN 120 simultaneously transmit the paging information, PDCCH, PHICH, and PCFICH, the access node 110 may inform the RN 120 of the scheduling of such control information and data content and any physical layer parameters, such as modulation, coding, and/or rate matching parameters. In the case where the access node 110 and a plurality of RNs 120 transmit the same CRS or the same CRS and DRS to the UAs 130, the PDCCH control information may be broadcasted in advance from the access node 110 to the RNs 120.

In an embodiment, the UA 130 may estimate composite channel conditions and provide feedback, such as PMI, to the RN 120 and access nodes 110, and the RN 120 may support a plurality of MIMO modes, such as spatial multiplexing, transmit diversity, and beamforming. The MIMO modes supported by the RN 120 may be based on the type of reference signal from the RN 120, i.e. CRS or DRS, for demodulation at the UA 130.

For instance, in the case of a CRS transmission from the RN 120, the UA 130 may receive a composite channel from both the access node 110 and the RN 120. The UA 130 may then estimate the composite channel to select a PMI. The UA 130 may receive a first channel matrix $H_1$ from the access node 110 and a second channel matrix $H_2$ from the RN 120. The first and second channel matrices relate the received signal R at the UA 130 to the simultaneously or synchronously transmitted signal S from the access node 110 and the RN 120 under a signal noise level N, such as $R=(H_1+H_2)*S+N$. The UA 130 may select the PMI, denoted as a precoding matrix P, based on the composite channel matrix $H=H_1+H_2$. The UA 130 may send a feedback to the access node 110 comprising the precoding matrix P. The precoding matrix P may also be determined by the access node 110 and forwarded, for example via backhaul signaling, to the RN 120. The access node 110 may also transmit the PMI in the PDCCH. Using the PMI or precoding matrix P for MIMO transmissions, the R signal may be calculated, such as $R=(H_1+H_2)*P*S+N=H*P*S+N$. For instance, at the receiver side, the UA 130 may perform a MIMO receiver algorithm, e.g. Minimum Mean Square Error (MMSE), vertical Bell labs layered space-time (V-BLAST), Zero Forcing (ZF), or Successive Interference Cancellation (SIC), to obtain the signal based on the composite channel H and the precoding matrix P. The RN 120 may remain transparent to the UA 130 and may not require additional feedback from the UA 130 to support the MIMO transmission. The UA 130 may also select the RI and the CQI in a manner similar to the PMI selection.

In other words, a Type-II RN can transmit a CRS that is identical to the CRS transmitted from an access node on the same antenna port. That is, the CRS contained in the same PRB or RB of the same subframe on the same antenna port is identical. The UA 130 might receive only the combined CRS on the same antenna port. That is, the CRS transmitted from the Type-II relay is transparent to the UA 130. When the antenna ports are different, the UA 130 might receive the CRS respectively from different antenna ports. In this case, the Type-II relay may or may not be transparent to the UA 130.

In the case of a DRS transmission from the RN 120, the UA 130 may receive the composite channel H without the PMI and perform channel estimation on the composite DRS from both the access node 110 and the RN 120. In Release 8, the DRS may be used to support transmission mode 7 at the UAs. Similarly, the transmission mode 7 may also be supported at the RN 120 to improve performance when the RN 120 transmits the DRS instead of the CRS. In Release 9, dual layer beamforming is proposed as an additional feature. In an embodiment, channel estimation for the dual layer beamforming mode may be supported using orthogonal DRS. The RN 120 may form or transmit its beam to the UA 130 independently or with assistance from the access node 110. During each transmission, the access node 110 may configure single user or multi-user transmissions. The RN 120 may be configured to support both transmissions either by detecting the UA's feedback information, e.g. RI or PMI feedback, or by receiving transmission scheme information from the access node 110 in advance. However, when the RN 120 transmits the DRS instead of the CRS to support MIMO transmission, the UA 130 may send RI or PMI feedback based on the received CRS from the access node 110. As such, the channel from the RN 120 to the UA 130 may not be considered in the feedback information, which may cause inaccurate channel estimation and RI/PMI selection and hence may degrade performance. To improve performance, the UA 130 may perform channel estimation and RI/PMI selection using the received DRS (and the CRS from the access node 110) and return updated RI/PMI information.

In other words, a Type-II RN can transmit a DRS that is identical to the DRS transmitted from an access node on the same antenna port. That is, the DRS contained in the same PRB or RB of the same subframe on the same antenna port is identical. The UA 130 might receive only the combined DRS on the same antenna port. That is, the DRS transmitted from the Type-II relay is transparent to the UA 130. The UA 130 might determine the PMI based on the received combined DRS, and then the UA 130 may feed back the determined PMI back to the access node.

Also, a Type-II RN can transmit a CSI-RS that is identical to the CSI-RS transmitted from an access node on the same antenna port. That is, the CSI-RS contained in the same PRB or RB of the same subframe on the same antenna port is identical. The UA 130 might receive only the combined CSI-RS on the same antenna port. That is, the CSI-RS transmitted from the Type-II RN is transparent to the UA 130. When the antenna ports are different, the UA 130 might receive the CSI-RS respectively from different antenna ports. The UA 13 might make the channel measurements based on the received combined CSI-RS.

In an embodiment, the UA 130 may calculate the composite channel H based on the received signal R and the precoding matrix P for DRS transmissions, reselect the RI/PMI, and forward the composite channel H and the updated RI/PMI to the access node 110 and the RN 120. If the access node 110 overwrites the PMI from the UA 130, channel estimation may be degraded. However, if the access node 110 does not frequently overwrite the PMI from the UA 130, channel degradation may be limited. Further, channel estimation based on DRS transmission from the RN 120 may be combined with channel estimation based on CRS transmissions from the access node 110 to improve performance.

Figure 7:
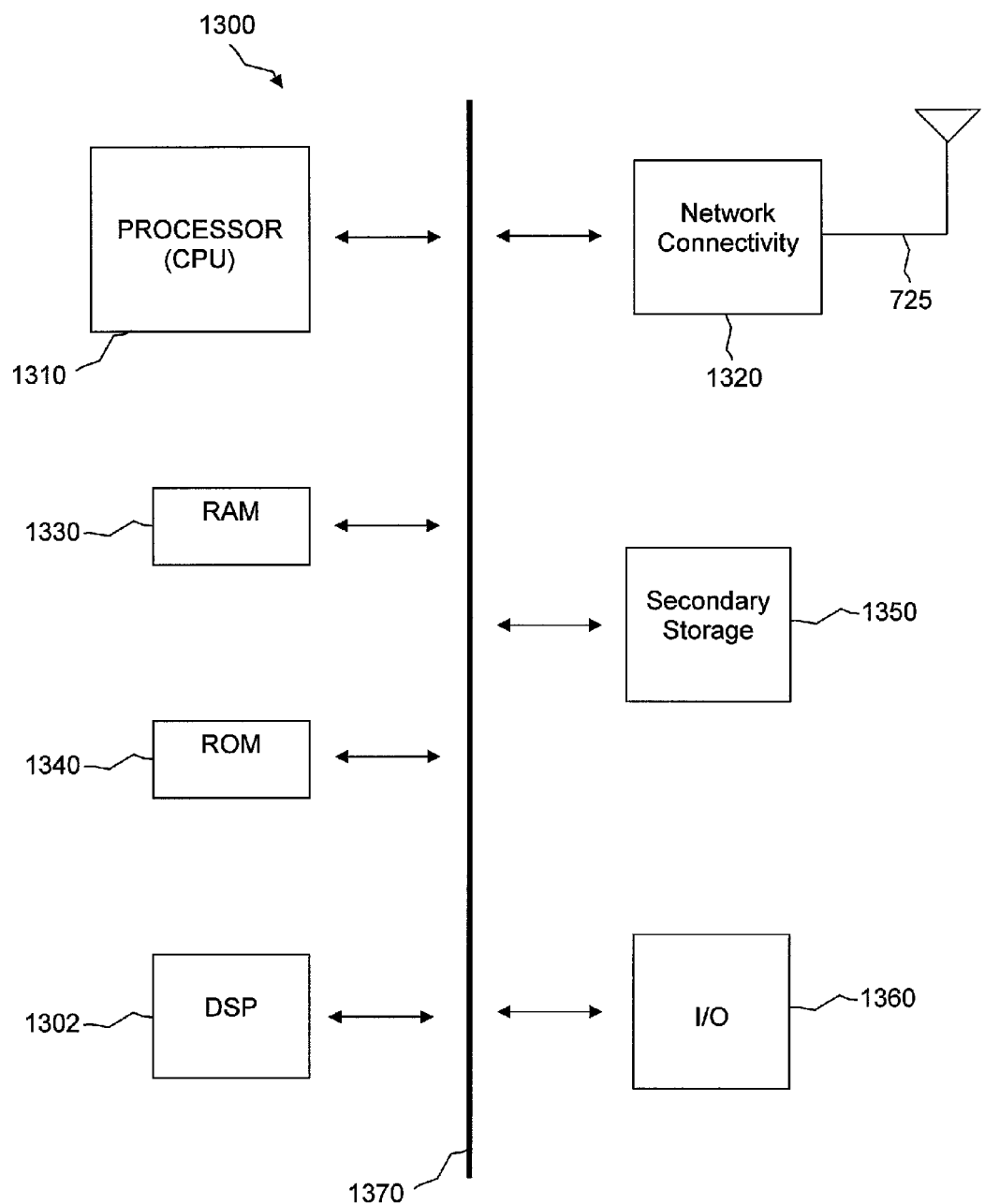
FIG. 7 illustrates a processor and related components suitable for implementing the several embodiments of the present disclosure.

The UA 130 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

Various combinations of the components of the system 1300, including memory, hardware, firmware, software or others may be referred to herein as a "component".

The following are incorporated herein by reference for all purposes: 3GPP TS 36.814, 3GPP TS 36.304, and 3GPP TS 36.331.

In an embodiment a network is provided. The network comprising a relay node configured to transmit a CRS to a plurality of UAs using a first plurality of physical antennas and/or virtual antennas, and an access node configured to transmit a second CRS to the UAs using a second plurality of physical antennas and/or virtual antennas, wherein the first CRS and the second CRS are combined for the same number of first and second physical antennas and/or virtual antennas.

In another embodiment, a method is provided, comprising transmitting a CRS to a UA for channel measurements, and transmitting a MBSFN subframe configuration information to the UA to schedule the CRS signal reception.

In another embodiment, a network is provided, comprising a relay node configured to transmit a DRS to a UA using a first plurality of physical antennas and/or virtual antennas, and an access node configured to transmit a second DRS to the UA using a second plurality of physical antennas and/or virtual antennas, wherein the first DRS and the second DRS are transmitted at about the same time.

In another embodiment, a network is provided, comprising a relay node configured to transmit an orthogonal CSI RS and a DRS to a UA using a plurality of physical antennas and/or virtual antennas, wherein the orthogonal CSI RS is used for channel measurement and the DRS is used for signal demodulation.

In another embodiment, a user agent is provided, comprising a plurality of antenna ports, and a processor configured to receive a first CRS and a second CRS using the antenna ports, wherein the first CRS is transmitted using a first plurality of physical antennas and/or virtual antennas and the second CRS is transmitted using a second plurality of physical antennas and/or virtual antennas, and wherein the first CRS and the second CRS are combined for the same number of first and second physical antennas and/or virtual antennas.

In another embodiment, a user agent is provided, comprising a plurality of antenna ports, and a processor configured to receive a first DRS and a second DRS signal using at least one of the antenna ports, wherein the first DRS and the second DRS are transmitted at about the same time.

In another embodiment, a user agent is provided, comprising a plurality of antenna ports, and a processor configured to receive an orthogonal CSI RS and a DRS transmitted fro an access node and/or relay node using at least one of the antenna ports, to use the orthogonal CSI RS for channel measurement, and to use the DRS for signal demodulation.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A network, comprising:
    a relay node configured to transmit a first common reference signal (CRS) to a plurality of user agents (UAs) using a first plurality of physical antennas and/or virtual antennas; and
    an access node configured to transmit a second CRS to the UAs using a second plurality of physical antennas and/or virtual antennas,
    wherein the first CRS and the second CRS are combined for the same number of first and second physical antennas and/or virtual antennas,
    wherein the UAs receive a combined CRS comprising the first CRS and the second CRS transmitted using the same number of first and second physical antennas and/or virtual antennas, and wherein the UAs separately receive the first CRS and the second CRS transmitted using a different number of first and second physical antennas and/or virtual antennas,
    wherein the UA receives a first channel matrix from the relay node and a second channel matrix from the access node and estimates a Precoding Matrix Indicator (PMI) using a composite channel matrix comprising the first channel matrix and the second channel matrix for MIMO transmissions.

2. The network of claim 1, wherein, when the first CRS and the second CRS are transmitted using a different number of first and second physical antennas and/or virtual antennas, each of the UAs receives the combined CRS on a first respective antenna port and separately receives the first CRS or the second CRS on a second respective antenna port, and when the first CRS and the second CRS are transmitted using the same number of first and second physical antennas and/or virtual antennas, each of the UAs receives the combined CRS on the first and second antenna ports, respectively.

3. The network of claim 1, wherein the access node transmits a multicast/broadcast single frequency network (MB-SFN) subframe to the UAs at about the same time the relay node receives a subframe from the access node, and wherein the relay node transmits a non-MBSFN subframe when the relay node does not receive a subframe from the access node.

4. The network of claim 3, wherein the UAs receive the combined CRS if the relay node transmits the first CRS in the non-MBSFN subframes.

5. The network claim 1, wherein the UAs are Release 8 UAs, and wherein the relay node is a Type II relay.

6. The network of claim 1, wherein the relay node further transmits a dedicated reference signal (DRS) to one of the UAs.

7. The network of claim 1, wherein the UA is a Release 10 UA that uses the first CRS and/or the second CRS for multiple-input multiple-output (MIMO) channel measurements.

8. The network of claim 1, wherein the relay node and the access node transmit control signaling information simultaneously using transmit diversity.

9. The network of claim 8, wherein the control signaling information comprises system information (SI) including master information block (MIB) and system information blocks (SIBs).

10. The network of claim 8, wherein the control signaling information are transmitted using a broadcast channel (BCH), paging channel (PCH), physical downlink control channel (PDCCH), physical hybrid automatic repeat request indicator channel (PHICH), physical control format information channel (PCFICH), or combinations thereof.

11. A method of wireless communications, comprising:
transmitting a common reference signal (CRS) to a user agent (UA) for channel measurements;
transmitting a multicast/broadcast single frequency network (MBSFN) subframe configuration information to the UA to schedule the CRS signal reception, wherein the MBSFN subframe configuration information is transmitted using dedicated signaling, wherein the MBSFN subframe configuration information is forwarded using a system information block (SIB-2) in a subframe, wherein the MBSFN configuration information is semi-static based on network requirements;
determining the current number of UAs configured for receiving MBSFN subframes and Quality of Service requirements (QoS);
calculating the current spectral efficiency over a Un interface associated with the UA;
calculating the spectral efficiency required for the Un interface; and
changing the SIB-2 to reconfigure the MBSFN subframes if there is a substantial difference between the current and required spectral efficiencies.

12. The method of claim 11, further comprising signaling the MBSFN subframe configuration information to a Release 10 UA.

13. A network, comprising:
a relay node configured to transmit a first dedicated reference signal (DRS) to a user agent (UA) using a first plurality of physical antennas and/or virtual antennas; and
an access node configured to transmit a second DRS to the UA using a second plurality of physical antennas and/or virtual antennas,
wherein the first DRS and the second DRS are transmitted at about the same time,
wherein a Precoding Matrix Indicator (PMI) feedback from the UA is based on the first DRS and the second DRS,
wherein the UA is a Release 9 UA, and wherein the first DRS is transmitted using dual layer beamforming.

14. The network of claim 13, wherein the first DRS and the second DRS are combined for the same number of first and second physical antennas and/or virtual antennas.

15. The network of claim 13, wherein the relay node does not transmit control signaling information.

16. The network of claim 13, wherein the relay node and/or the access node receive the PMI feedback from the UA.

17. A network, comprising:
a relay node configured to transmit a channel state information reference signal (CSI RS) and a dedicated reference signal (DRS) to a user agent (UA) using a plurality of physical antennas and/or virtual antennas;
wherein the CSI RS is used for channel measurement and the DRS is used for signal demodulation,
wherein the CSI RS transmitted from a physical or virtual antenna of the relay node is on the same subframe with another CSI RS transmitted from a physical or virtual antenna of an access node in a different coverage area,
wherein the UA is a UA that uses the CSI RS for multiple-input multiple-output (MIMO) channel measurement,
wherein the UA sends a MIMO channel measurement feedback using a precoding matrix indicator (PMI) and/or channel matrix H to support cooperative multi-point (CoMP) MIMO transmissions and non-CoMP PDSCH MIMO transmission on the traffic and/or control channels.

18. The network of claim 17, wherein the CSI RS transmitted from the relay node is on a different subframe, and/or different time/frequency tones and/or different sequence in the subframe than other orthogonal CSI RS transmitted from another physical or virtual antenna from another access node or relay node.

19. The network of claim 17, wherein the CSI RS transmitted from the relay node is on the same time/frequency tones in the subframe and has the same sequence with another CSI RS transmitted from the access node or another relay node in different coverage areas.

20. The network of claim 17, wherein the CSI RS transmitted from the relay node is on the same subframe and time/frequency tones in the subframe and has the same sequence with another CSI RS transmitted from a physical or virtual antenna of another access node or another relay node in the same coverage areas, and wherein all the CSI RS are combined into a composite channel.

21. The network of claim 17, wherein the relay node is configured to transmit the CSI RS based on its antenna configuration by an access node, and wherein the UA is configured to receive the CSI RS by the access node via signaling.

22. The network of claim 17, wherein the DRS and traffic/control channel transmissions to the UA are jointly precoded across the physical or virtual antennas of a plurality of access nodes or relay nodes.

23. The network of claim 17, wherein the DRS and traffic/control channel transmissions to the UA from different access nodes and/or relay nodes are precoded separately using the physical or virtual antennas on each node.

24. The network of claim 23, wherein different access nodes and/or relay nodes transmit different spatial multiplexed layers to the UA.

25. The network of claim 23, wherein different access nodes and/or relay nodes transmit the same set of spatial multiplexed layers to the UA.

26. The network of claim 23, wherein one spatial multiplexed layer for the UA is transmitted from more than one access nodes and/or relay nodes and another spatial multiplexed layer is transmitted from one of the access nodes or relay nodes.

27. A user agent comprising:
a plurality of antenna ports; and a component configured to receive a first common reference signal (CRS) and a second CRS using the antenna ports, wherein the first CRS is transmitted using a first plurality of physical antennas and/or virtual antennas and the second CRS is transmitted using a second plurality of physical antennas and/or virtual antennas, and wherein the user agent receives a combined CRS comprising the first CRS and the second CRS transmitted using the same number of first and second physical antennas and/or virtual antennas, and wherein the user agent receives the combined CRS on one of the antenna ports and separately receives the first CRS or the second CRS on another one of the antenna ports when the first CRS and the second CRS are transmitted using a different number of first and second physical antennas and/or virtual antennas, wherein the UA receives a first channel matrix from the relay node and a second channel matrix from the access node and estimates a Precoding Matrix Indicator (PMI) using a composite channel matrix comprising the first channel matrix and the second channel matrix for MIMO transmissions.

28. The user agent of claim 27, wherein the component receives a multicast/broadcast single frequency network (MBSFN) subframe and a non-MBSFN subframe at different time intervals.

29. The user agent of claim 27, wherein the component further receives a dedicated reference signal (DRS).

30. A user agent comprising:
a plurality of antenna ports; and
a component configured to receive a first dedicated reference signal (DRS) and a second DRS signal using at least one of the antenna ports, wherein the first DRS and the second DRS are transmitted at about the same time, and the first DRS or the second DRS is transmitted by a relay node using a plurality of physical antennas and/or virtual antennas, wherein the component receives the first DRS which is transmitted by the relay node using dual layer beamforming in Release 9, wherein a Precoding Matrix Indicator (PMI) feedback from the UA is based on the first DRS and the second DRS.

31. A user agent comprising:
a plurality of antenna ports; and
a component configured:
to receive an channel state information reference signal (CSI RS) and a dedicated reference signal (DRS) transmitted from an access node and/or a relay node using at least one of the antenna ports, wherein the CSI RS is transmitted on the same subframe in different time/frequency tones than another CSI RS transmitted from another access node and/or relay node in different coverage areas;
to use the CSI RS for multiple-input multiple-output (MIMO) channel measurement; and
to use the DRS for signal demodulation,
wherein the component generates a MIMO channel measurement feedback using a precoding matrix indicator (PMI) and/or channel matrix H.

32. The user agent of claim 31, wherein the MIMO channel measurement feedback supports cooperative multi-point (COMP) MIMO transmissions and non-COMP MIMO transmissions on traffic and/or control channels.

* * * * *